Nov. 27, 1962    M. L. KNOLLMAN    3,065,590
HILLSIDE HARVESTER
Filed Feb. 20, 1961    3 Sheets-Sheet 1

INVENTOR.
M. L. KNOLLMAN

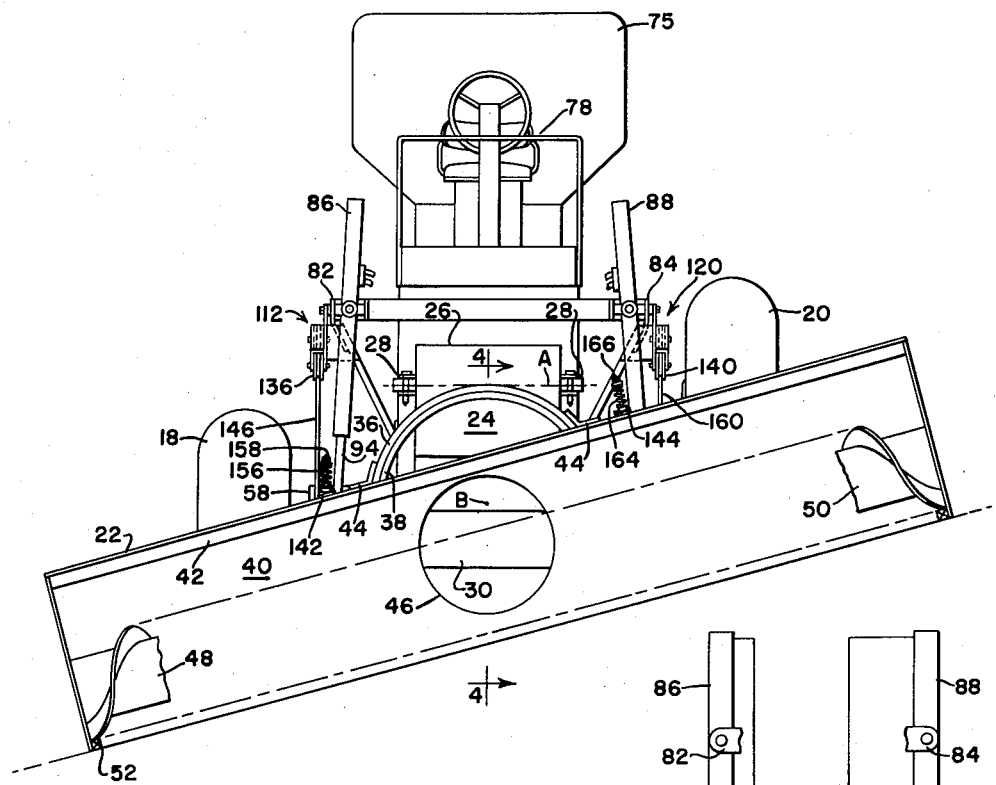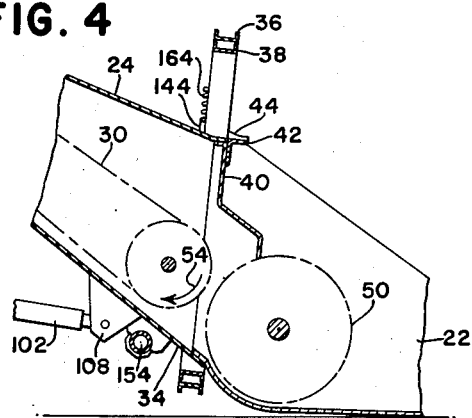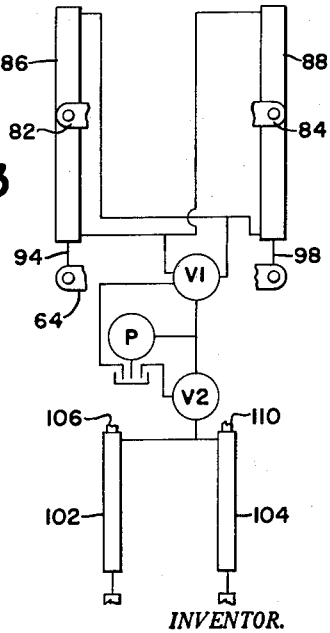

Nov. 27, 1962 M. L. KNOLLMAN 3,065,590
HILLSIDE HARVESTER
Filed Feb. 20, 1961 3 Sheets-Sheet 3

INVENTOR.
M. L. KNOLLMAN

United States Patent Office 3,065,590
Patented Nov. 27, 1962

3,065,590
HILLSIDE HARVESTER
Melvin L. Knollman, East Moline, Ill., assignor to Deere & Company, Moline, Ill., a corporation of Delaware
Filed Feb. 20, 1961, Ser. No. 90,498
2 Claims. (Cl. 56—209)

This invention relates to a hillside harvester and more particularly to improved means for coordinating the wheels and header in the movement thereof during which they adapt themselves to different slopes and changes in slopes as the body is leveled.

The invention features primarily an improvement in the structure forming the subject matter of the U.S. patent to Heitshu 2,821,059, wherein are outlined the problems involved in designing a commercially acceptable hillside harvester. As pointed out there, and as is familiar to those versed in the art, the hillside combine has a fore-and-aft body supported by transversely spaced wheel means that are vertically adjustable in opposition so that on an upward slope to the right, for example, the right-hand wheel means is higher than the left-hand wheel means but the body remains level because of associated leveling mechanism. Since the crop is growing on the upward right-hand slope, the header must necessarily accommodate itself to this slope. It is found desirable to incorporate some form of positive control of the header so that it partakes of the movement of the wheels; that is to say, as the right-hand wheel moves up, for example, the right-hand end of the header must move up, it being clear that the header is mounted on the body by means providing a fore-and-aft axis. Further, in typical combines, the header will be connected to the forward end of the feeder house on said fore-and-aft axis and the feeder house in turn is connected at its rear end to the front end of the body on a transverse axis. Hence, the header turns about the fore-and-aft axis relative to the feeder house, and the feeder house and header as a unit pivot about the transverse axis relative to the body, as for accomplishing adjustments in the height of cut. Because of the two axes involved and the relative remoteness between the wheel means and the header, the force-transmitting connections involved in the control means have heretofore been relatively complex. According to the present invention, these complexities have been eliminated by the provision of novel control means employing, at each side of the machine, a flexible element trained over suitable guide means so that movement of the associated wheel means is positively transmitted to the associated side of the header. It is a further object of the invention to employ flexible cables for this purpose and to incorporate in the guide means one or more sheaves or their equivalents, certain of which are so arranged relative to the transverse feeder house axis as to permit vertical adjustment of the feeder house about this axis without substantially increasing the tension in the cables or equivalent elements. Further objects reside in the provision of a relatively simple construction, one that is positive and trouble-free in operation, and one that incorporates cushioning means in the flexible element connections to absorb shocks and accommodate various other irregularities.

The foregoing and other important objects and desirable features inherent in and encompassed by the invention will become apparent as a preferred embodiment thereof is disclosed, by way of example, in the ensuing description and accompanying sheets of drawings, the several figures of which are described below.

FIG. 2 is a front view of the machine, with portions shown schematically.

FIG. 3 is a schematic diagram of a typical hydraulic system employed in leveling the harvester and in adjusting the height of the header.

FIG. 4 is a section on the line 4—4 drawn to a slightly enlarged scale.

Figures 1, 7:
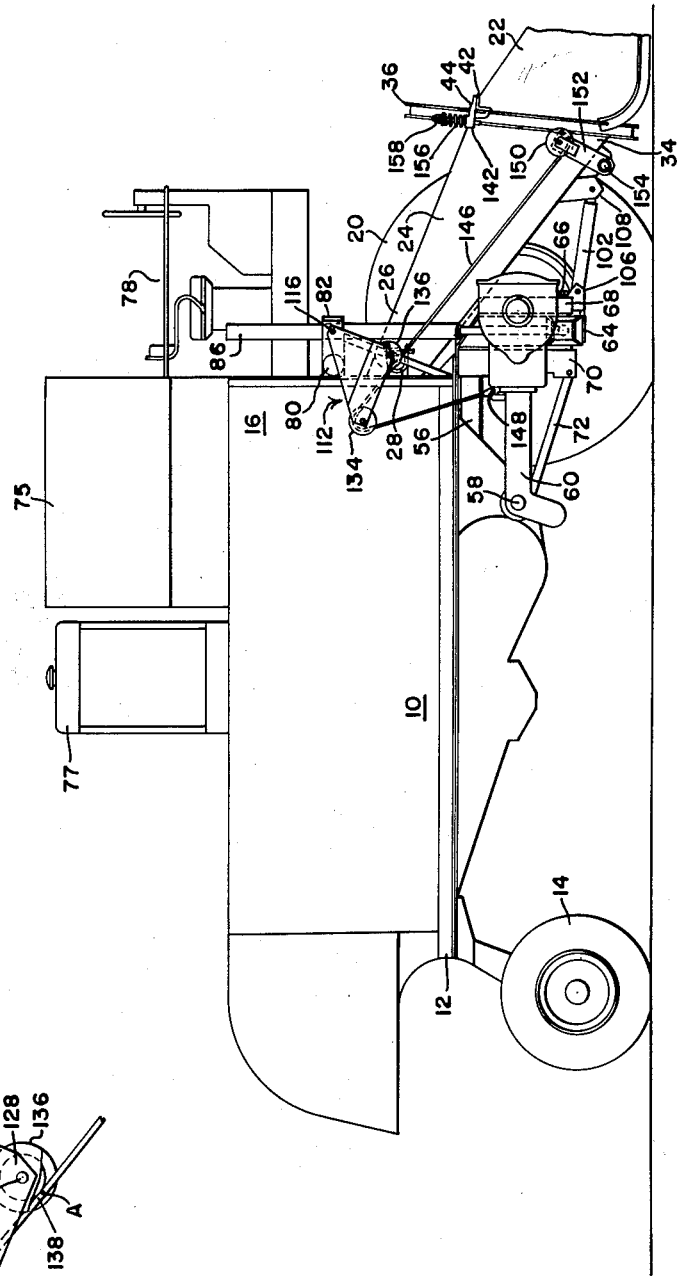
FIG. 1 is a side elevation of the machine, shown with one of the forward wheel means removed to expose the structure that would otherwise be obscured.
FIG. 7 is an enlarged fragmentary view illustrating the principles of one of the body-carried guide means.
Figure 5:
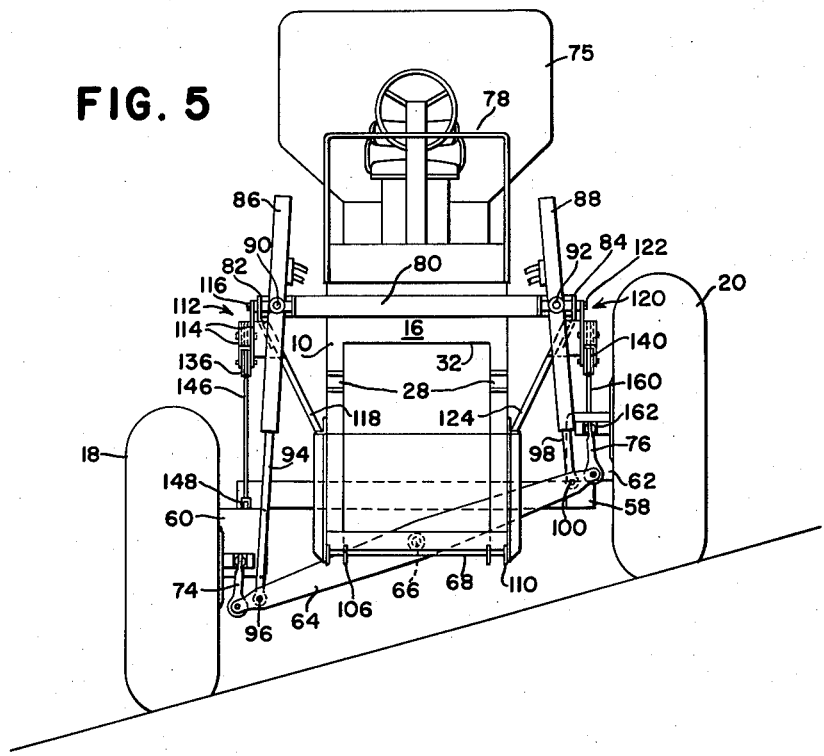
FIG. 5 is a front view of the machine as shown in FIG. 1 but with the header removed.

The harvester chosen for purposes of illustration is, in the main, typical of those finding current commercial favor and has a longitudinal or fore-and-aft body 10 carried at its rear end 12 on rear wheel means 14 and carried at its front end 16 on right and left hand front wheel means 18 and 20 respectively. The expressions "right hand" and "left hand" are used with reference to the position of an observer standing behind the machine and facing forwardly. The body 10 typically contains threshing and separating mechanism (not shown) for handling the grain or other crop fed thereto by means of a transverse header 22 via a fore-and-aft feeder house 24. The feeder house 24 has a rear end 26 connected to the front end 16 of the body 10 by a pair of transversely coaxial trunnions 28 which establish a transverse pivot axis at A (FIG. 7). The feeder house contains therewithin any suitable type of conveyor such as that represented at 30 in FIG. 4, by means of which the crop is transferred rearwardly through the open rear end of the feeder house into the forward end of the body 10 via a forward feed opening 32 (FIG. 5).

In a broad sense, the feeder house 24 may be regarded as a forward extension of the body 10, and the means for connecting the header 22 to the forward end 34 of the feeder house provides a substantially fore-and-aft pivot axis B (FIG. 2). This axis is established by a pair of concentric rings 36 and 38, each preferably in the form of a channel and provided with suitable bearings (not shown) therebetween so that one ring may turn relative to the other about the axis B. The inner ring 38 is rigidly secured in any suitable manner not important here to the forward end 34 of the feeder house 24, and the outer ring 36 is suitably rigidly secured to the rear of the header 22, the header having a transverse rear wall 40 including an elongated transverse support member 42 to which portions of the ring 36 may be secured as at 44. As will be seen in FIG. 2, the length of the header measured transversely of the machine is considerably greater than the width of the machine measured in the same direction. The rear wall 40 has therein a central circular feed opening 46 to which crops are fed laterally inwardly by oppositely moving right and left hand augers 48 and 50 respectively, the augers being fed in the first instance by crop cut by conventional cutting mechanism, illustrated generally at 52, as the machine progresses over the field. As previously described, this crop is handled by the conveyor 30, which travels in the direction of the arrow 54 (FIG. 4) to deliver the crop rearwardly to the front end of the body via the body feed opening 32, where it is handled by the threshing and separating mechanism (not shown).

The forward end of the body is provided with subframe structure 56 which includes a transverse shaft 58 on which the rear ends of the right and left hand arm means 60 and 62 are mounted for vertical swinging. Each arm extends forwardly from the pivot shaft 58 and journals its front wheel means via any associated structure, not material here. Suffice it to note that the arm means 60 and 62 mount the wheels for vertical adjustment in opposition; that is, as one wheel goes up, the other wheel goes down. In a typical situation as represented in FIGS. 2 and 5, there is an upward slope to the left (to the right of the reader) and the left hand wheel is higher than the right hand wheel. Equalization of the movement of the wheels is accomplished by a transverse equalizer 64 pivoted intermediate its ends at 66 on a fore-and-aft axis by means including a depending portion 68 of the subframe structure 56. Here again, the details are relatively immaterial and those illustrated are by way of example only. The subframe further includes a rear depending portion 70 just rearwardly of the equalizer bar 64 and the portions 68 and 70 are spaced apart fore and aft to provide a space in which the equalizer bar operates as it swings about its pivot 66. The portion 70 is appropriately braced to the remainder of the structure as by braces 72, only one of which appears in the drawings. The connections of opposite ends of the equalizer 64 to the front ends of the wheel arms 60 and 62 are articulate, as indicated respectively at 74 and 76.

Figure 6:
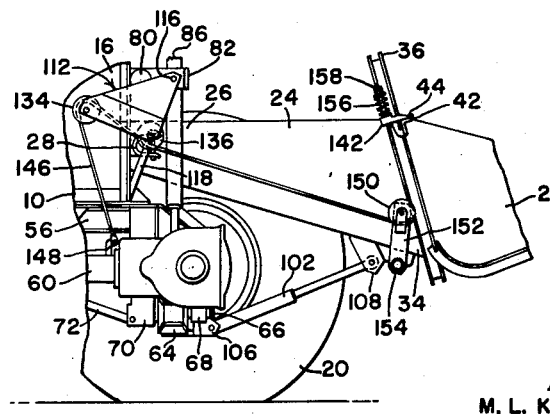
FIG. 6 is a fragmentary elevation of a forward portion of the machine with the feeder house and header elevated.

The body 10 is illustrated as being provided with a conventional grain tank 75, behind which is illustrated an internal combustion engine 77 for furnishing power to drive the machine as well as to operate its harvesting and threshing parts. Ahead of the grain tank 75 is a typical operator's station 78, which projects at the forward end 16 of the body 10 in overhanging relationship to the rear portion of the feeder house 24. Intervening between the under side of the operator's station 78 and the top of the feeder house 24 is transverse supporting structure including a beam 80 which has opposite ends providing right and left hand mounts 82 and 84, respectively, for right and left hand hydraulic rams 86 and 88, respectively. The mounts 82 and 84 may include both fore and aft and transverse pivot axes as at 90 and 92 to provide for the requisite freedom of motion of the rams, it being clear of course that the beam 80 is rigid on the body and the rams themselves are non-axially displaceable relative to the beam. The right hand ram 86 has a piston (not shown) the rod 94 of which is pivotally connected at 96 to the right hand end of the equalizer 64. Similarly, a piston rod 98 of the left hand ram 88 is pivotally connected to the left hand end of the equalizer 64 at 100. The rams are powered in opposition so that extension of one and simultaneous retraction of the other causes the wheel means 18 and 20 to change positions according to the slope. The means may be automatic in response to appropriate leveling means not important here. A representative automatic leveling means is shown in the U.S. patent to Vogelaar 2,801,511. For present purposes, the rams 86 and 88 may be regarded as under control of an automatic valve V1 connected in circuit with a suitable hydraulic pump P (FIG. 3) and with the rams via appropriate fluid conducting lines, the illustration of which is believed to be clear enough without further description. The above-mentioned Heitshu and Vogelaar patents clearly illustrate this phase, the details of which are immaterial here. In FIGS. 2 and 5 of the present case, the fluid lines for the rams 86 and 88 have been illustrated as broken away so as to more clearly expose more important structure. The same is true of right and left hand header adjusting rams 102 and 104, respectively, for the feeder house-header height adjustment. As best shown in FIGS. 1 and 6, the ram 102 is connected at one end to a mounting ear 106 on the depending front structure 68 and its piston rod is connected at 108 to a lower forward portion of the feeder house 24 adjacent to its front end 34. Similarly, the left hand adjusting ram 104 is mounted by equivalent means, the mounting ear for which on the structure 68 is shown at 110 in FIG. 5. In FIG. 3, the hydraulic circuit shows that the rams 102 and 104 are under control of a valve V2 appropriately connected to the pump P, previously described. In this case, control of the valve V2 will be manual and any suitable control lever (not shown) may be mounted at the operator's station 78 for the convenience of the operator. Again, the specific details are unimportant and therefore they are not disclosed. Suffice it to note that operation of the valve V2 will incur extension or retraction of the rams 102 and 104 in unison, thus effecting adjustment of the feeder house-header unit about the transverse axis A through the feeder house mounting trunnions 28. Also, changes in slope, to which the automatic leveling means, as represented by the valve V1 in FIG. 3, is sensitive, will incur extension and retraction of the leveling rams 86 and 88 which, acting on the equalizer bar 64, will level the body 10 relative to the wheels 18 and 20 which of course follow the slope encountered.

For the purpose of causing the header 22 to accommodate itself to the slope encountered by the wheels 18 and 20, there is provided at each side of the machine a header control means. That for the right hand side will be described first.

This means includes support means designated in its entirety by the numeral 112, best shown in substantial isolation from the remainder of the machine in FIG. 7. This support means may be of any suitable structure, such as a pair of plates 114 rigidly secured together and rigidly mounted on the right hand side of the body in the general area of the feeder house trunnion 28. The means 112 is in laterally overhanging relationship to the forward portion of the right hand wheel arm means 60 and is suitably connected to the right hand mount 82 for the right hand ram 86, as at 116, and is additionally braced by supporting structure at 118 to a lower forward portion of the proximate side of the body. The left hand side of the machine is provided with a similar support means, designated in its entirety at 120, and similarly and symmetrically constructed, being mounted on the left hand mount 84 for the left hand ram 88 at 122 and being further braced by supporting structure at 124, it being clear that the two support means are therefore rigid parts of the body and are thus isolated from the movable feeder house and header.

The right hand support means 112 has a rearward portion 126 and a forward portion 128, and these portions respectively carry transverse shafts 130 and 132 which respectively journal first and second or rear and front sheaves 134 and 136 respectively, the shafts 130 and 132 of course providing parallel transverse axes. The shaft 132 is located above and slightly forwardly of the pivot axis A so that a lower part of the sheave 136, as at 138, is substantially in register with the axis A. The purpose of this arrangement will be clear from the following description. It will be understood, of course, that a similar arrangement exists at the opposite side of the machine in the support means 120, the forward sheave for which is visible at 140.

As previously described, the ring structure 36—38 may be such as to employ, in the mounting of the ring 36 on the header 32, the pair of transversely spaced mounting means 44. In this case, these mounting means 44 are spaced equidistant at opposite sides of the fore-and-aft pivot axis B and slightly above that axis. Right and left hand connectors 142 and 144 respectively are mounted laterally outwardly of the mounting means 44, each connector being fixedly secured to the top of the header as by being secured to the top angle bar 42.

At the right hand side of the machine, a flexible tension element, here in the form of a cable 146, is connected at one end at 148 to a forward portion of the right hand wheel arm means 60 and extends thence upwardly and is trained over the rear sheave 134 and then extends forwardly under the front sheave 136, engaging this sheave at its lower portion of its periphery as described at 138. The cable extends thence downwardly and forwardly and under a third sheave 150 and thence upwardly to the connector 142. The sheave 150 is mounted on suitable bracket means including an arm 152 secured to the right hand end of a transverse support in the form of a tubular member 154. This entire structure is fixedly mounted on the forward lower portion of the feeder house 24, as will be clear. The connector 142 includes yielding cushioning means in the form of a coiled compression spring 156 to which the upper forward end of the cable is anchored at 158. The cable is thus tensioned between the anchor point at 148 on the arm 60 and is trained through the guide means established by the several sheaves, and is again anchored at its opposite end at 142—158 on the header at the right hand side of the fore-and-aft center line B. A similar cable 160 is anchored at 162 to the left hand wheel arm 62 and is trained thence over left hand sheaves that correspond to the right hand sheaves 134 and 136, one of which has been previously described and illustrated at 140 and the presence of the other of which will be obvious from the symmetry of the structures. The cable extends thence forwardly through a third sheave that corresponds in function, position and structure to that described at 150, and the cable 160 extends thence up to the connector 144 to which it is connected by cushioning means in the form of a coil compression spring 164, similar to that at 156. The connection is completed by anchoring the cable 160 to the top of the spring 164 as at 166.

Thus it will be seen that as the wheel means 18 and 20 adjust themselves vertically in opposition to accommodate varying ground slopes, the forces transmitted through the cables 146 and 160 are delivered to the header 22 via the connectors 142 and 144 which are equidistantly spaced at opposite sides of the fore-and-aft center line or axis B. Therefore, as one wheel moves up, the corresponding side of its header will also move up, which will be clear from the fact that the third sheaves, as represented by the sheave 150, is fixed to the feeder house. For example, and looking now at FIG. 1, it will be seen that if the wheel arm 60 moves downwardly, it will exert a downward force on the rear portion of the cable 146, which will draw rearwardly on the cable between the sheaves 136 and 150 and therefore will pull downwardly on that portion of the cable between the sheave 150 and the connector 142, from which it follows that the right hand end of the header 22 will also move downwardly. At the same time, the other wheel 20 is moving upwardly and the cable at that side will operate reversely; that is, the left hand end of the header will move upwardly. The cables thus are at all times maintained relatively taut and therefore provide positive and accurate control of the header for the purposes of adjusting the header to the slopes encountered.

At the same time, the relationship of the sheaves 136 and 140 to the axis A through the feeder house trunnions 28 enables vertical adjustment of the feeder house 24 about the axis A without changing the tension in the cables 146 and 160. This will be clear from FIG. 7, wherein it will be noted that the sheave portion 138 of the sheave 136 is substantially in transverse register with the feeder house transverse pivot axis A, it being obvious, of course, that a similar portion on the left hand front sheave 140 performs the same function.

The control mechanism is relatively simple and therefore is economical to manufacture and install. Likewise, it is substantially trouble-free in operation and may be easily adjusted. Features and advantages other than those enumerated will readily occur to those versed in the art, as will many modifications and alterations in the preferred embodiment illustrated and described, all of which may be achieved without departure from the spirit and scope of the invention.

What is claimed is:
1. Header control means for a hillside harvester having a fore-and-aft body including a front end supported by transversely spaced wheel means relatively vertically adjustable in opposition and carried by rockable arm means, a fore-and-aft feeder house having a rear end pivoted to the body for vertical adjustment about a transverse axis adjacent to the wheel means and extending forwardly to a front end ahead of the wheel means and a header pivoted to the front end of the feeder house on a generally fore-and-aft axis, said header control means comprising: a pair of support means affixed to the body respectively at opposite sides thereof in the general area of the rear end of the feeder house and respectively adjacent to the wheel means and at a level above the respective arm means, each support means having a forward portion overlapping the feeder house transverse axis and further having a rearward portion; a pair of first sheaves journaled respectively on said rearward portions on a transverse axis; a pair of second sheaves journaled respectively on said forward portions on a transverse axis at a level below the axis of the first sheaves but spaced above the feeder house transverse axis so that the lower part of the periphery of each second sheave is substantially in transverse register with said feeder house transverse axis; a pair of coaxial third sheaves journaled respectively on opposite sides of the feeder house adjacent to the front end thereof; a pair of transversely spaced connectors on the header above the third sheaves and respectively at opposite sides of the fore-and-aft axis; and a pair of flexible tension elements, each connected at one end to the associated arm means and passed upwardly and forwardly around the associated first sheave, forwardly under the associated second sheave and thence forwardly under the associated third sheave and thence upwardly and having its other end connected to the associated connector on the header, the relative levels of the first, second and third sheaves at each side being such that when the header is in a normal operating position according to adjustment of the feeder house about its aforesaid transverse axis the stretch of the associated tension element from the first sheave to the third sheave will be substantially straight.

2. The invention defined in claim 1, in which: each support means is spaced transversely outwardly from the proximate side of the body; and downwardly and inwardly extending supporting structure is connected between each support means and a lower part of the proximate side of the body.

References Cited in the file of this patent
UNITED STATES PATENTS

| | | |
|---|---|---|
| 2,656,668 | Witzel | Oct. 27, 1953 |
| 2,796,717 | Orelind et al. | June 25, 1957 |
| 2,821,059 | Heitshu | Jan. 28, 1958 |
| 2,871,646 | Heitshu et al. | Feb. 3, 1959 |
| 2,947,134 | Clifford et al. | Aug. 2, 1960 |